United States Patent
Subbiah et al.

(10) Patent No.: US 11,256,958 B1
(45) Date of Patent: Feb. 22, 2022

(54) TRAINING WITH SIMULATED IMAGES

(71) Applicants: Melanie S. Subbiah, San Francisco, CA (US); Jamie R. Lesser, San Francisco, CA (US); Nicholas E. Apostoloff, San Jose, CA (US)

(72) Inventors: Melanie S. Subbiah, San Francisco, CA (US); Jamie R. Lesser, San Francisco, CA (US); Nicholas E. Apostoloff, San Jose, CA (US)

(73) Assignee: Apple Inc., Cupertino, CA (US)

( * ) Notice: Subject to any disclaimer, the term of this patent is extended or adjusted under 35 U.S.C. 154(b) by 352 days.

(21) Appl. No.: 16/519,686

(22) Filed: Jul. 23, 2019

Related U.S. Application Data

(60) Provisional application No. 62/789,193, filed on Jan. 7, 2019, provisional application No. 62/717,250, filed on Aug. 10, 2018.

(51) Int. Cl.
*G06K 9/62* (2006.01)
*G06N 20/00* (2019.01)
*G06T 7/73* (2017.01)

(52) U.S. Cl.
CPC ......... *G06K 9/6259* (2013.01); *G06K 9/6262* (2013.01); *G06N 20/00* (2019.01); *G06T 7/74* (2017.01); *G06T 7/75* (2017.01); *G06K 2209/27* (2013.01); *G06T 2207/20081* (2013.01)

(58) Field of Classification Search
CPC .. G06K 9/6256; G06K 9/6259; G06K 9/6262; G06K 2209/27; G06T 7/74; G06T 7/75; G06T 2207/20084; G06T 2207/20081; G06T 15/00; G06T 15/005; G06T 15/20; G06T 15/205; G06T 2215/16; G06N 20/00; G06N 3/10
See application file for complete search history.

(56) References Cited

U.S. PATENT DOCUMENTS

| | | | |
|---|---|---|---|
| 10,169,678 B1 * | 1/2019 | Sachdeva | G05D 1/0221 |
| 2015/0019214 A1 | 1/2015 | Wang et al. | |
| 2017/0236013 A1 * | 8/2017 | Clayton | G06K 9/00221 |
| | | | 382/104 |

(Continued)

FOREIGN PATENT DOCUMENTS

| | | |
|---|---|---|
| WO | 2018002910 A1 | 1/2018 |
| WO | 2018071392 A1 | 4/2018 |
| WO | 2018184187 A1 | 10/2018 |

OTHER PUBLICATIONS

Veeravasarapu et al., "Adversarially Tuned Scene Generation", Jul. 2017, IEEE, 2017 IEEE Conference on Computer Vision and Pattern Recognition (CVPR), p. 6441-6449. (Year: 2017).*

(Continued)

*Primary Examiner* — Vincent Rudolph
*Assistant Examiner* — Timothy Choi
(74) *Attorney, Agent, or Firm* — Young Basile Hanlon & MacFarlane, P.C.

(57) ABSTRACT

A method that includes obtaining real training samples that include real images that depict real objects, obtaining simulated training samples that include simulated images that depict simulated objects, defining a training dataset that includes at least some of the real training samples and at least some of the simulated training samples, and training a machine learning model to detect subject objects in unannotated input images using the training dataset.

21 Claims, 10 Drawing Sheets

(56) References Cited

U.S. PATENT DOCUMENTS

| | | | |
|---|---|---|---|
| 2018/0345496 A1* | 12/2018 | Li | G06T 17/00 |
| 2019/0147582 A1* | 5/2019 | Lee | G06T 11/00 |
| | | | 382/156 |
| 2020/0050965 A1* | 2/2020 | Harvill | G06N 20/00 |
| 2021/0201078 A1* | 7/2021 | Yao | G06K 9/6257 |

OTHER PUBLICATIONS

Athalye et al., "Synthesizing Robust Adversarial Examples", Jul. 2018, PMLR, Proceedings of the 35th International Conference on Machine Learning, vol. 80, p. 1-10. (Year: 2018).*

Liu, Y., et al., "Computing Long-Term Daylighting Simulations From High Dynamic Range Imagery Using Deep Neural Networks", 2018 Building Performance Analysis Conference and SimBuild co-organized by ASHRAE and IBPSA-USA, Sep. 2018 (8 pp).

Kim, C., et al., "Generation of large-scale simulated utterances in virtual rooms to train deep-neural networks for far-field speech recognition in Google Home", Interspeech 2017, Aug. 20, 2017 (5 pp).

Shrivastava, A., et al., "Learning from Simulated and Unsupervised Images through Adversarial Training", Cornell University, Computer Science, Computer Vision and Pattern Recognition, CVPR 2017 oral presentation, arXiv:1612.07828v2 [cs.CV] Jul. 19, 2017, (16 pp).

Bai, J., et al., "Chinese Image Character Recognition Using DNN and Machine Simulated Training Samples", International Conference on Artificial Neural Networks, ICANN 2014, pp. 209-216 (8 pp).

* cited by examiner

TRAINING WITH SIMULATED IMAGES

CROSS-REFERENCE TO RELATED APPLICATIONS

This application claims the benefit of U.S. Provisional Application No. 62/717,250, filed on Aug. 10, 2018 and U.S. Provisional Application No. 62/789,193, filed on Jan. 7, 2019, the contents of which are incorporated by reference herein in their entireties for all purposes.

TECHNICAL FIELD

This disclosure relates to training with simulated images, for example, in robotics and machine learning applications.

BACKGROUND

Training a machine learning model requires a large training dataset that includes training samples that cover all of the types of situations that the machine learning model is intended to interpret. Because of this, collecting adequate data for training can be time consuming.

SUMMARY

Systems and methods for training a machine learning model with simulated images are described herein.

One aspect of the disclosure is a method that includes obtaining real training samples that include real images that depict real objects, obtaining simulated training samples that include simulated images that depict simulated objects, defining a training dataset that includes at least some of the real training samples and at least some of the simulated training samples, and training a machine learning model to detect subject objects in unannotated input images using the training dataset.

Obtaining the real training samples may include capturing the real images in a real-world environment using a camera. Obtaining simulated training samples may include generating a simulated scene that includes a simulation model and subject models that correspond to the simulated objects using a simulator and rendering the simulated images of the simulated scene using a rendering engine. The real training samples may include annotations indicating locations of the real objects in the real images. The simulated training samples may include annotations indicating locations of the simulated objects in the simulated images.

Another aspect of the disclosure is a method that includes initializing a simulation environment in a simulator, adding multiple groups of simulated objects to the simulated environment, and obtaining simulated training samples by performing multiple iterations of an image generation procedure. The image generation procedure includes determining a location and an orientation with respect to the simulated environment for a virtual camera such that at least one group of simulated objects from the multiple groups of simulated objects is located within a field of view of the virtual camera, positioning the virtual camera with respect to the simulated environment according to the location and orientation, and rendering a simulated training image for one of the simulated training samples using the virtual camera.

In some implementations, the method includes adding the simulated training samples to a training dataset and training a machine learning model using the training dataset. The training dataset may also include real training samples.

Adding multiple groups of simulated objects to the simulated environment may be performed according to scene configuration parameters. Each iteration of the image generation procedure may also include modifying one or more scene configuration parameters that affect a visual appearance of the simulated environment.

Another aspect of the disclosed embodiments is a method that includes obtaining, from an object detection system, failure condition parameters that describe observed conditions that correspond to a detection failure, determining a scene configuration for a simulator based on the failure condition parameters, generating a simulated scene using the simulator according to the scene configuration, and generating a simulated training sample using the simulated scene.

Some implementations of the method include adding the simulated training sample to a training dataset that includes real training samples, and training a machine learning model using the training dataset.

Some implementations of the method include determining, by the object detection system, that the detection failure has occurred, and outputting the failure condition parameters automatically, by the object detection system, in response to the determination that the detection failure has occurred. The object detection system may determine that the detection failure has occurred by comparison of a detected location value with a ground truth location value.

Another aspect of the disclosure is a method that includes obtaining real training samples, obtaining simulated training samples, defining a machine learning model that includes a first group of input layers, a second group of input layers that are arranged in parallel relative to the first group of input layers, and a group of output layers that are arranged in series relative to the first group of input layers and the second group of input layers, and training the machine learning model by providing the real training samples as inputs to the first group of input layers and by providing the simulated training samples as inputs to the second group of input layers.

The real training samples may include real images and annotations indicating locations of real objects in the real images, and the simulated training samples may include simulated images and annotations indicating locations of simulated objects in the simulated images. Obtaining the real training samples may include capturing the real images in a real-world environment using a camera. Obtaining the simulated training samples may include rendering the simulated images using a simulator that generates a simulated scene that includes a simulation model and subject models that correspond to the simulated objects.

In some implementations, training the machine learning model configures the machine learning model to detect subject objects in unannotated input images. In some implementations, the group of output layers receives outputs from the first group of input layers and the second group of input layers as inputs.

Another aspect of the disclosure is a method that includes obtaining real training samples that include real images that depict real objects, obtaining simulated training samples that include simulated images that depict simulated objects, defining a training dataset that includes at least some of the real training samples and at least some of the simulated training samples, training a machine learning model to detect subject objects in unannotated input images using the training dataset to define a trained machine learning model, detecting objects using the trained machine learning model by providing sensor inputs to the trained machine learning model, and controlling operation of a physical system based on the detected objects.

DETAILED DESCRIPTION

Figure 1:
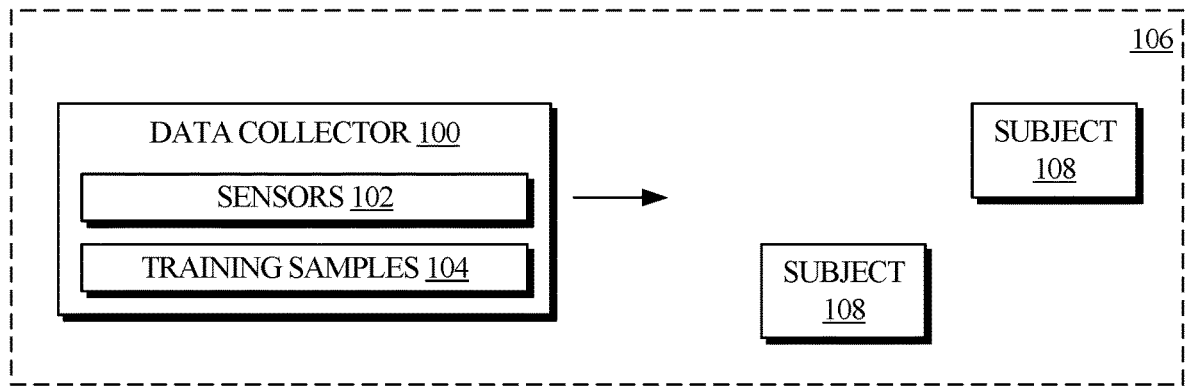
FIG. 1 is an illustration that shows a data collector that uses sensors to obtain training samples while traveling in an environment.

The systems and methods that are described herein are directed to training a machine learning model using simulated images.

The quality of a training dataset is critical for creating a successful machine learning model but achieving a balanced and accurate dataset that covers all of the classes of interest can be challenging. In particular, for the model to operate as intended, the training dataset needs to include a large number of samples for each of the classes of interest, with the samples representing a high level of diversity so that the model becomes feature invariant with respect to those features that are not relevant to the outcome produced by the model. As examples, features that may not be of interest to a particular model may include lighting conditions, type of sensor used, backgrounds, etc.

A number of issues can affect the quality of the training dataset. As one example, some classes of interest, referred to herein as rare classes, involve situations that occur only rarely under real-world conditions, but need to be included in the training dataset. As another example, some types of data are difficult to annotate accurately. As another example, network testing may identify edge cases that the network is handling incorrectly, and these edge cases may involve situations or conditions that are difficult to replicate.

For example, a team working on maps may need to collect training samples that include rare street signs. The signs must be located, and the location must be visited (e.g., by driving a collection vehicle to the location) to collect photographs of the rare street signs. These photographs would all have the same lighting conditions and the same backgrounds since they depict that same signs photographed at approximately the same time. Repeated trips to the same location would be required to obtain images of the rare street signs under different lighting conditions. Other locations where the same signs are present would need to be identified to capture images of the signs with different backgrounds. It should be understood that map data is an example of a type of data and training problem that the systems and methods described herein are applicable to, and that the systems and methods that are described herein can be applied to a large variety of different types of machine learning models and types of data.

The systems and methods herein are directed to using a simulator and a rendering engine to generate scenes with desired content to be used for training. The systems and methods described herein may generate simulated data and train and evaluate models using this data. The simulated data may be used in conjunction with non-simulated training samples that represent real-world conditions, such as photographs taken in a natural environment. This allows creation of content that provides training samples where gaps (low number of samples) would otherwise exist.

In some implementations, training data may be generated according to a predetermined scene configuration that can be instantiated at different locations within a simulation environment. The scene configuration can be used to spawn instances of objects within the simulation environment with random variations in characteristics at each of multiple location in the simulation environment. As examples, the characteristics that can be randomized in each location can include the number of objects, locations of objects, poses of objects, and features of objects, and can spawn with random variations on the same theme at each location. For example, a scene configuration can be defined to cause objects representing between 10 and 20 people to be spawned at one or more locations in the simulation environment such that they are crossing a road at a location in front of a virtual camera with an occluding vehicle sitting between the virtual camera and the objects representing people. This scene could be spawned at multiple random points on the map with these same general characteristics, but at each location, the number of persons, their poses, and their appearances would be randomized, thereby increasing the amount of visual diversity present in simulated training images that are rendered at the virtual camera locations.

FIG. 1 is an illustration that shows a data collector 100 that uses sensors 102 to obtain training samples 104 while traveling in an environment 106. Subjects 108 are present in the environment and may be depicted in the training samples. In one implementation, the data collector 100 is a vehicle and the environment 106 is a transportation network including roads that the data collector 100 travels on while collecting the training samples 104. In this example, the subjects 108 may be vehicles, bicycles, and/or pedestrians.

The sensors 102 output observations of objects in the environment 106, including the subjects 108. The sensors 102 can include two-dimensional sensor devices, such as a still camera or a video camera that obtains visible spectrum images or infrared spectrum images. The sensors 102 can include three-dimensional sensor devices such as a lidar sensor, a structured-light-stereo sensor, or any other suitable three-dimensional sensing system that outputs three-dimensional data, such as point clouds. Other information can be obtained by the sensors 102, such as various states for the data collector 100 and/or the subjects 108 including, as examples, such as position, velocity, heading, and acceleration measurements. Some of the information obtained by the sensors is stored as the training samples 104. The training samples 104 are information that can be used to train a machine learning model. As one example, the training samples can be images that depict the subjects 108 in the environment 106. The information contained in the training samples 104 may be referred to as real-world information, in that it depicts actual physical locations, objects, and people, as opposed to simulated locations, objects, and people. The data collector 100 may also include an object detection system that is configured to determine the position and pose of objects (e.g., for testing purposes).

Figure 2:
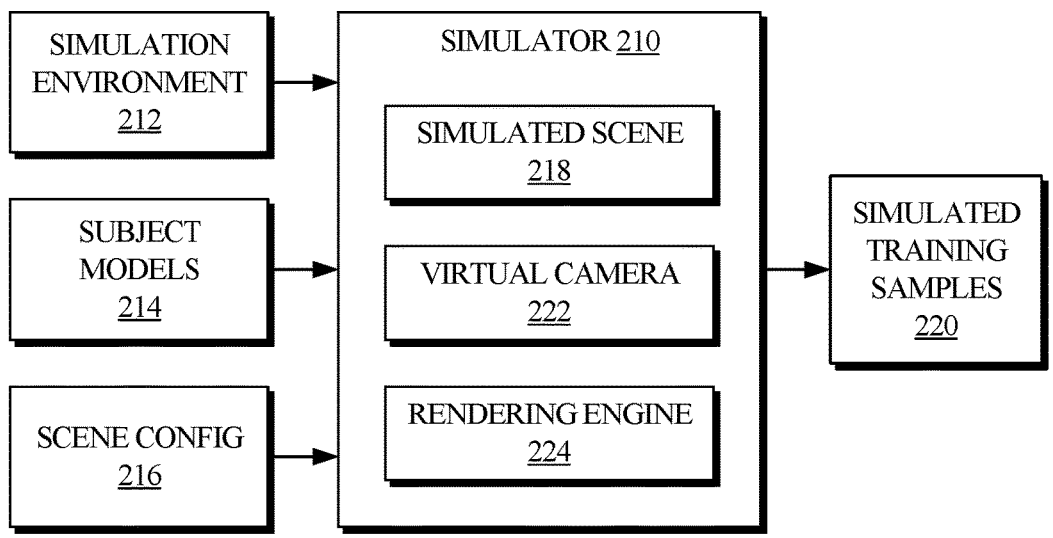
FIG. 2 is a block diagram that shows a simulator.

FIG. 2 is a block diagram that shows a simulator 210. The simulator 210 receives a simulation environment 212, subject models 214, and a scene configuration 216 as inputs. The simulator 210 generates a simulated scene 218, which is used to generate simulated training samples 220 (e.g., computer-generated training images and annotations). The simulator 210 also includes a virtual camera 222 and a rendering engine 224 that are used to generate the simulated training samples 220.

The simulation environment 212 and the subject models 214 may be three-dimensional models that are stored as data that is accessible to the simulator 210 so that the simulation environment 212 and the subject models 214 can be used to generate the simulated scene 218. In this context, the term "three-dimensional model" refers to a mathematical representation of a three-dimensional object or surface (e.g., interconnected polygons each defined in three-dimensional space by vertex locations) and may include texturing (e.g., bitmap images and surface mappings relative to the polygons).

The simulation environment 212 may be a three-dimensional model that depicts a simulated environment that is generally similar to the environment 106. In the current example, the simulation environment 212 may depict part of a transportation network that includes features similar to those found in the transportation network of the environment 106. In additional to a visual representation, the simulation environment 212 may incorporate a map that includes information like drivable regions and lanes, etc., which can be used to determine locations at which to capture training images that represent the point of view of a vehicle that is travelling along roadways that are depicted in the simulation environment 212. To define the simulation environment 212, a three-dimensional scan of a real environment can be used, such that the virtual environment resembles a real-world environment. For example, lidar data (e.g., point clouds) and camera data (e.g., images) can be used to create a three-dimensional map that is based on a real-world environment. A low-fidelity version of this data may be used as a basis for the simulation environment 212 in order to achieve diversity of background while maintaining fast load times.

The subject models 214 are three-dimensional models that are representative of the subjects 108 and can be included in the simulation environment 212 in order to generate simulated data that is representative of the subjects 108 in the environment 106. Multiple models with varied appearances may be included in the subject models 214.

The subject models 214 may be defined by modular parts that can be selected and combined randomly or according to a procedure, rules, or algorithm to define the subject models 214. Using modular parts for the subject models results in a high level of diversity among the subject models 214. As an example, subject models 214 may include human body models that are defined from modular parts such as, nine different heads, six tops, and six bottoms that can be combined to defined models having three different heights. In this example, the human body models can be positioned according to a large number of poses (e.g., using known skeletal animation techniques), and clothing items (which may be defined as three-dimensional models or textures) may be applied to the human body models to further increase scene diversity.

A rendering engine can be used that produces annotations along with rendered images such that the simulated training samples 220 that are generated by the simulator 210 include simulated training images and image annotations that include information about objects depicted in the images, such as the position, pose, and type of object depicted in the images. As an example, the annotations produced by the rendering engine may be bounding boxes.

The scene configuration 216 how a scene will be created. For example, the scene configuration may describe how many of the subject models to include in a scene and how the subject models 214 are to be arranged in the scene. The scene configuration 216 may be predetermined or may be wholly or partly random. For instance, the scene configuration 216 may include ranges for parameters, and random values may be generated within those ranges. Aspects of the scene configuration 216 may be controlled to define scenes that depict scenarios of interest for training purposes. Numerous scene configurations and variations (e.g., with randomized parameters) may be utilized by the simulator 210.

The simulator 210 selects a location from the simulation environment 212. The location may be selected from a list of predefined discrete locations, may be defined with constraints (e.g., random location along a path), or may be random. The selection of a location may include defining a position and orientation for the virtual camera 222 and/or another virtual sensor.

Using the selected location from the simulation environment 212, the subject models 214, and the scene configuration 216, the simulator 210 generates the simulated scene 218. The simulated scene 218 is a three-dimensional simulation environment that is populated with the subject models 214 according to the scene configuration 216. The simulated scene may also be populated with other objects, such as light sources or props, to enhance realism of the simulation environment 212. To generate simulated training images, the virtual camera 222 (or multiple virtual cameras) is located in the simulation environment 212.

For example, the virtual camera 222 defines a location and orientation from which the simulated training samples 220 are captured, and may also define parameters for capturing the simulated training samples 220, such as a field of view angle or other image capture parameters. The virtual camera 222 is used by the rendering engine 224 to generate simulated training images for the simulated training samples 220. The rendering engine 224 is configured to generate two-dimensional images (e.g., including pixels arranged in a two-dimensional array) according to known methods for generating two-dimensional images based on three-dimensional models, such as by mathematically modeling light incident on the virtual camera 222 or by other known techniques in the three-dimensional rendering field.

In addition to including simulated training images, the simulated training samples 220 also include annotations. Since the simulated training images are generated by the simulator 210, the simulator 210 has perfect knowledge of the states of objects at the time each of the simulated images is generated, and this information is used as a basis for creating the annotations, such as bounding boxes representing object locations in images, metadata describing the three-dimensional position and pose of objects in the images, or metadata describing surface elevations at various points that are depicted in the images.

The virtual sensors are used to output the simulated training samples, including, for example, simulated training images that depict the subject models 214 in the simulation environment 212 along with ground truth information.

Figure 3:
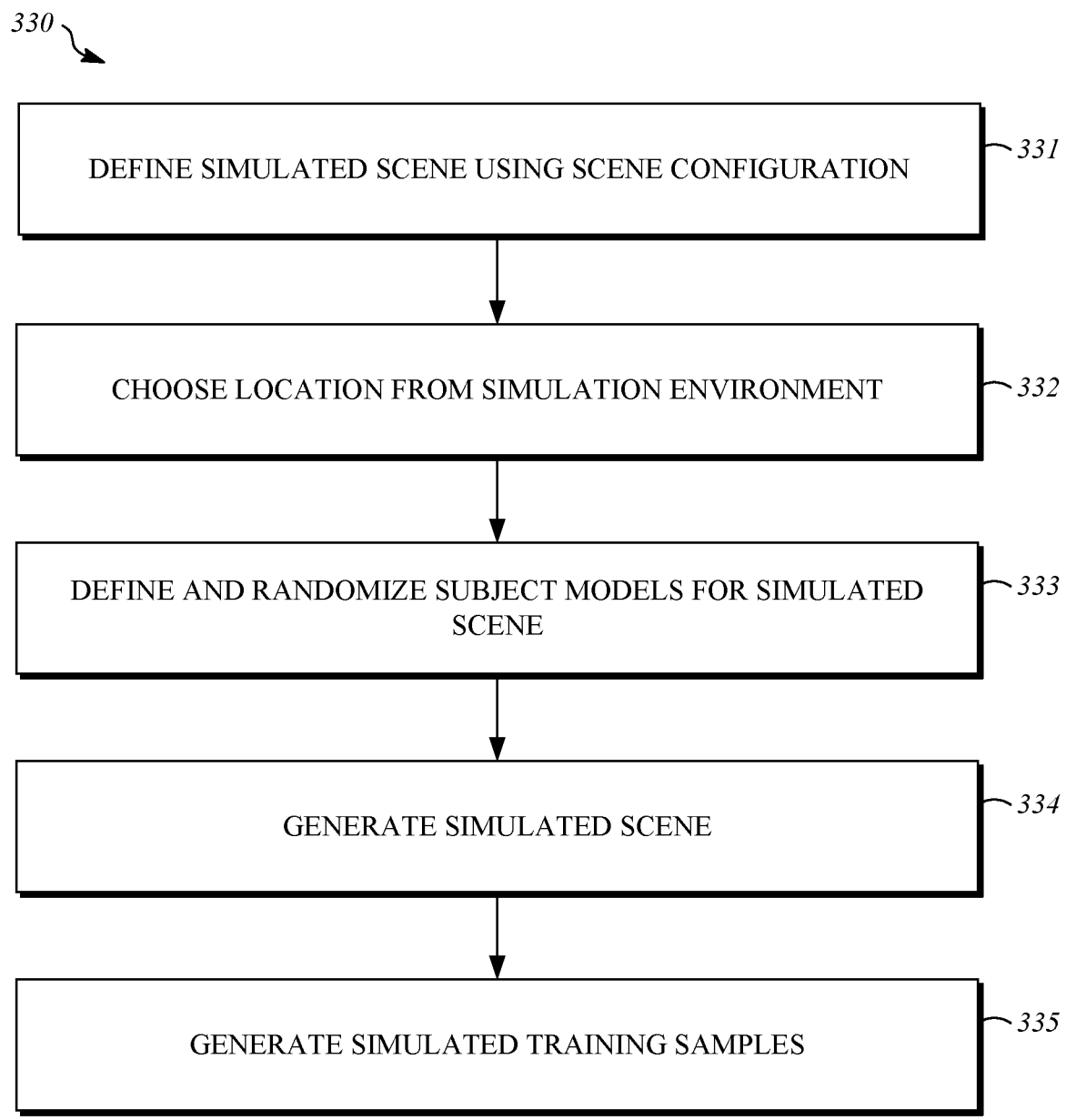
FIG. 3 is a flowchart that shows a process for generating simulated training samples.

FIG. 3 is a flowchart that shows a process 330 for generating simulated training samples. The process 330 can be executed using a computing device such as one or more processors that execute instructions that are stored in memory. The instructions cause performance of the process 330 by the computing device. Alternatively, the process 330 can be implemented directly in hardware, firmware, or software, circuitry, or a combination thereof. The process 330 may be implemented using a simulator, such as the simulator 210.

In operation 331, the simulated scene 218 is defined by the simulator 210 using the scene configuration 216. In operation 332, a location is chosen from the simulation environment 212. The subject models 214 are defined in operation 333 according to the scene configuration 216, including randomizing the subject models 214. The simulated scene is generated in operation 334, such as by populating the simulation environment 212 with the subject models 214 at the selected location. In operation 335, simulated training samples are generated, for example, using a simulated sensor, such as by rendering one or more virtual images using a virtual camera.

The process 330 can be performed numerous times (e.g., hundreds of thousands) to generate a large number of the simulated training samples 220. To facilitate generation of very large numbers of the simulated training samples 220, the assets used, including the simulation environment 212 and the subject models 214 may be low-fidelity assets, to reduce the compute time and human time (e.g., artist) required to generate the simulated training samples 220.

Figure 4:
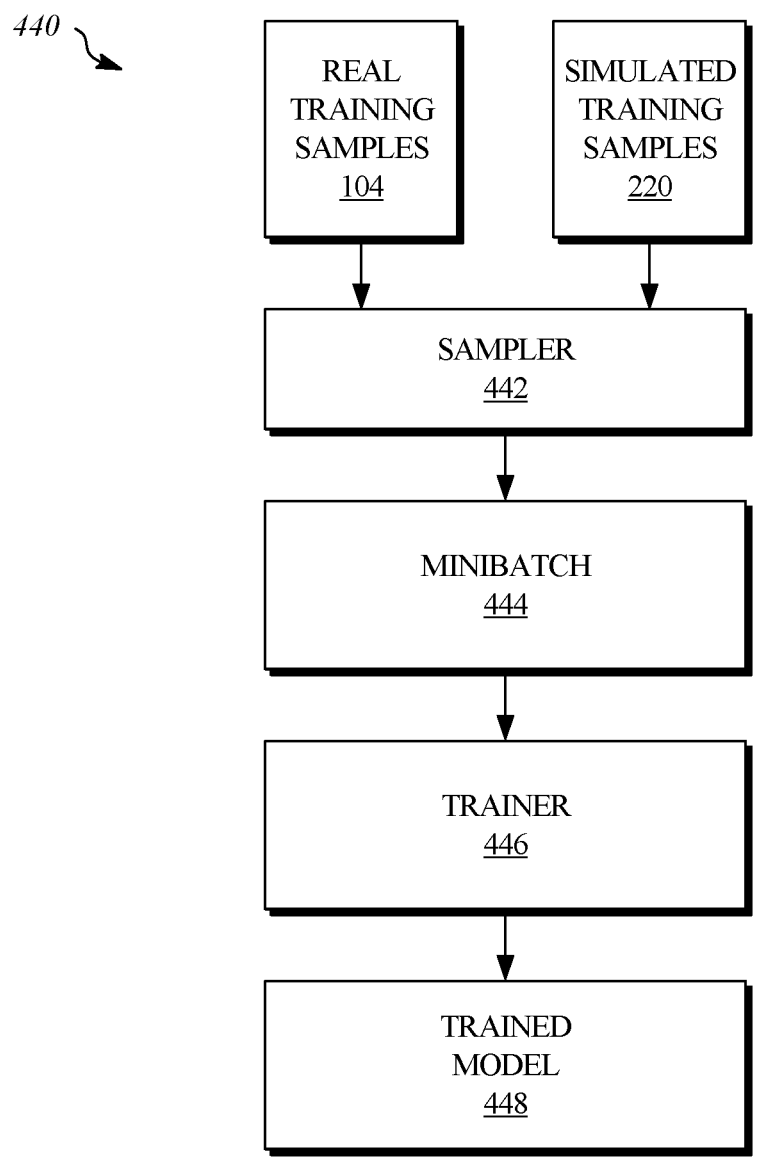
FIG. 4 is a block diagram that shows a training system.

FIG. 4 is a block diagram that shows a training system 440. The training samples 104 and the simulated training samples 220 are made available to a sampler 442. The sampler selects images (and/or other training inputs) from the training samples 104 and the simulated training samples 220 to define a minibatch 444. The minibatch 444 may include examples that are sourced from both of the training samples 104 and the simulated training samples 220.

The trainer 446 utilizes the training inputs from the minibatch 444 to train a machine learning model, such as a deep neural network (DNN) according to known methods. The output of the trainer 446 is a trained model 448, such as a trained deep neural network.

Figure 5:
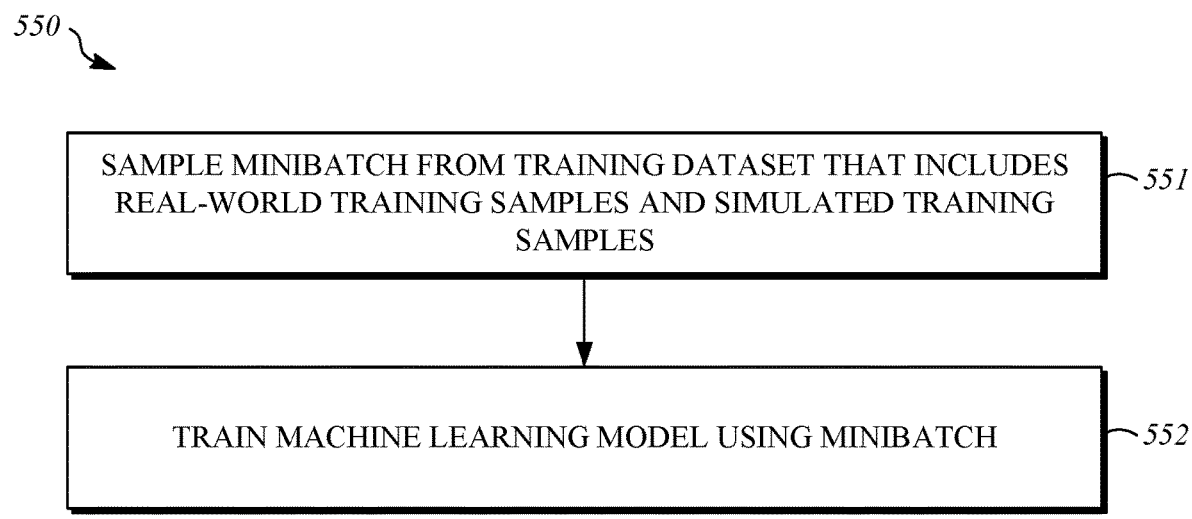
FIG. 5 is a flowchart that shows a process for training using simulated images.

FIG. 5 is a flowchart that shows a process 550 for training using simulated images. The process 550 can be executed using a computing device such as one or more processors that execute instructions that are stored in memory. The instructions cause performance of the process 550 by the computing device. Alternatively, the process 550 can be implemented directly in hardware, firmware, or software, circuitry, or a combination thereof. The process 550 may be implemented using a training system that is configured to optimize a machine learning model, such as the training system 440.

Operation 551 includes sampling the minibatch 444 from real-world training samples, such as the training samples 104, and from simulated training samples, such as the simulated training samples 220.

Operation 552 includes training a machine learning model using the minibatch 444, which can be performed as described with respect to the trainer 446 and the trained model 448.

Figure 6:
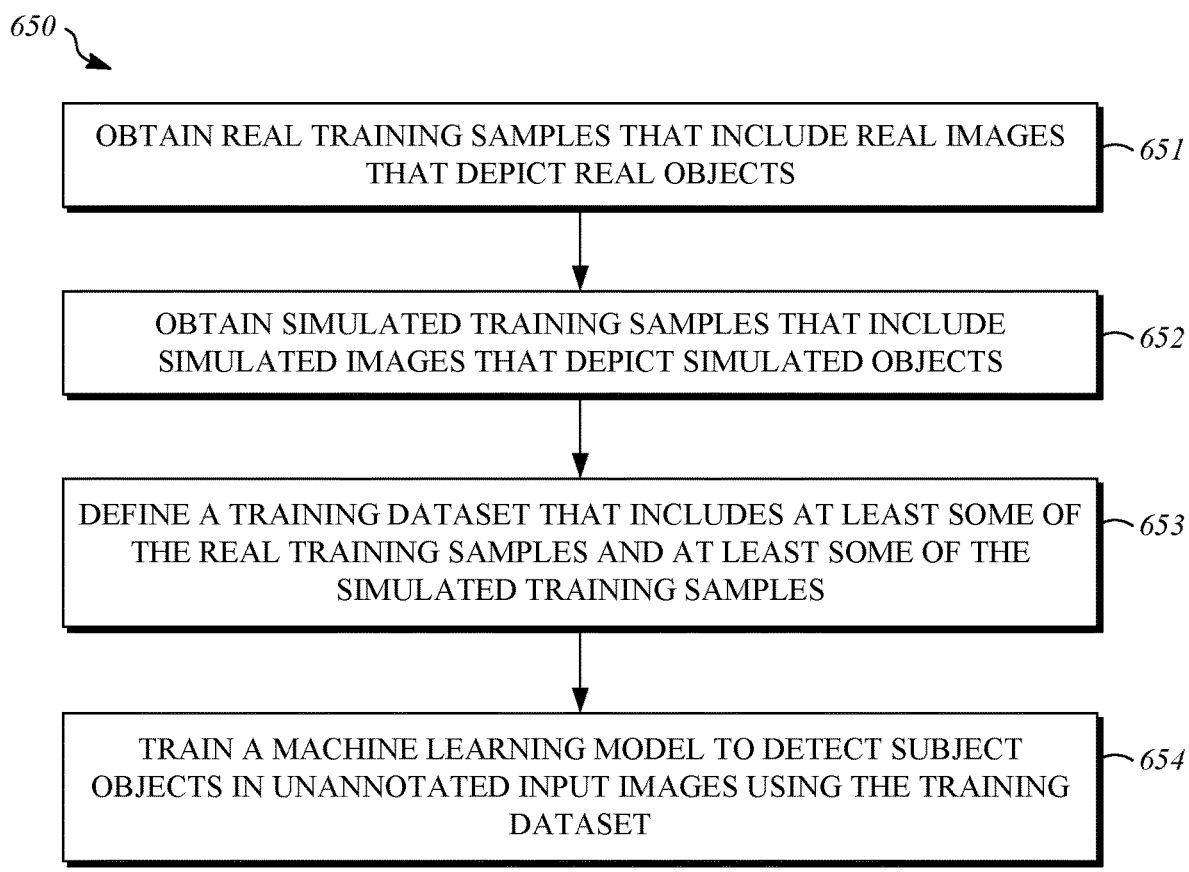
FIG. 6 is a flowchart that shows a process for training using simulated images.

FIG. 6 is a flowchart that shows a process 650 for training using simulated images. The process 650 can be executed using a computing device such as one or more processors that execute instructions that are stored in memory. The instructions cause performance of the process 650 by the computing device. Alternatively, the process 650 can be implemented directly in hardware, firmware, or software, circuitry, or a combination thereof. The process 650 may be implemented using a simulator, such as the simulator 210 and using a training system that is configured to optimize a machine learning model, such as the training system 440.

Operation 651 includes obtaining real training samples that include real images that depict real objects. Obtaining the real training samples may include capturing the real images in a real-world environment using a camera. The real training samples may include annotations indicating locations of the real objects in the real images.

Operation 652 includes obtaining simulated training samples that include simulated images that depict simulated objects. Obtaining simulated training samples may include rendering the simulated images using a simulator that generates a simulated scene that includes a simulation model and subject models that correspond to the simulated objects. The simulated training samples may include annotations indicating locations of the simulated objects in the simulated images.

Operation 653 includes defining a training dataset that includes at least some of the real training samples that were obtained in operation 651 and at least some of the simulated training samples that were obtained in operation 652. As one example, all of the available real training samples and simulated training samples can be incorporated in the training dataset. As another example, some of the real training samples and the simulated training samples can be randomly selected (e.g., by sampling a minibatch from each of the real training samples and the simulated training samples) for inclusion in the training dataset. Defining the training dataset in operation 653 may be an automated process that is performed by a computing device without manual selection of the training samples that are included in the training dataset.

Operation 654 includes training a machine learning model to detect subject objects in unannotated input images using the training dataset that was defined in operation 653. Unannotated input images are images that are not associated with side information that describes the content of the image, such as information that describes the presence, position, and/or orientation of objects in the unannotated input images.

The trained machine learning model that results from operation 654 may be used in a number of ways. One example includes detecting objects using the trained machine learning model by providing sensor inputs to the trained machine learning model and controlling operation of a physical system based on the detected objects. The sensors inputs may be, for example, images. The physical system may be a mobile robot such as an autonomous vehicle. Another example includes detecting objects using the trained machine learning model by providing sensor inputs to the trained machine learning model and using information describing the detected objects (e.g., object type, object position, object pose, etc.) to localize objects relative to an augmented reality system or a mixed reality system. Another example includes detecting objects using the trained machine learning model in the context of a simulated environment for use in controlling the behavior of an artificial intelligence agent in the simulated environment (e.g., intelligent control of an actor in a video game).

Figure 7:
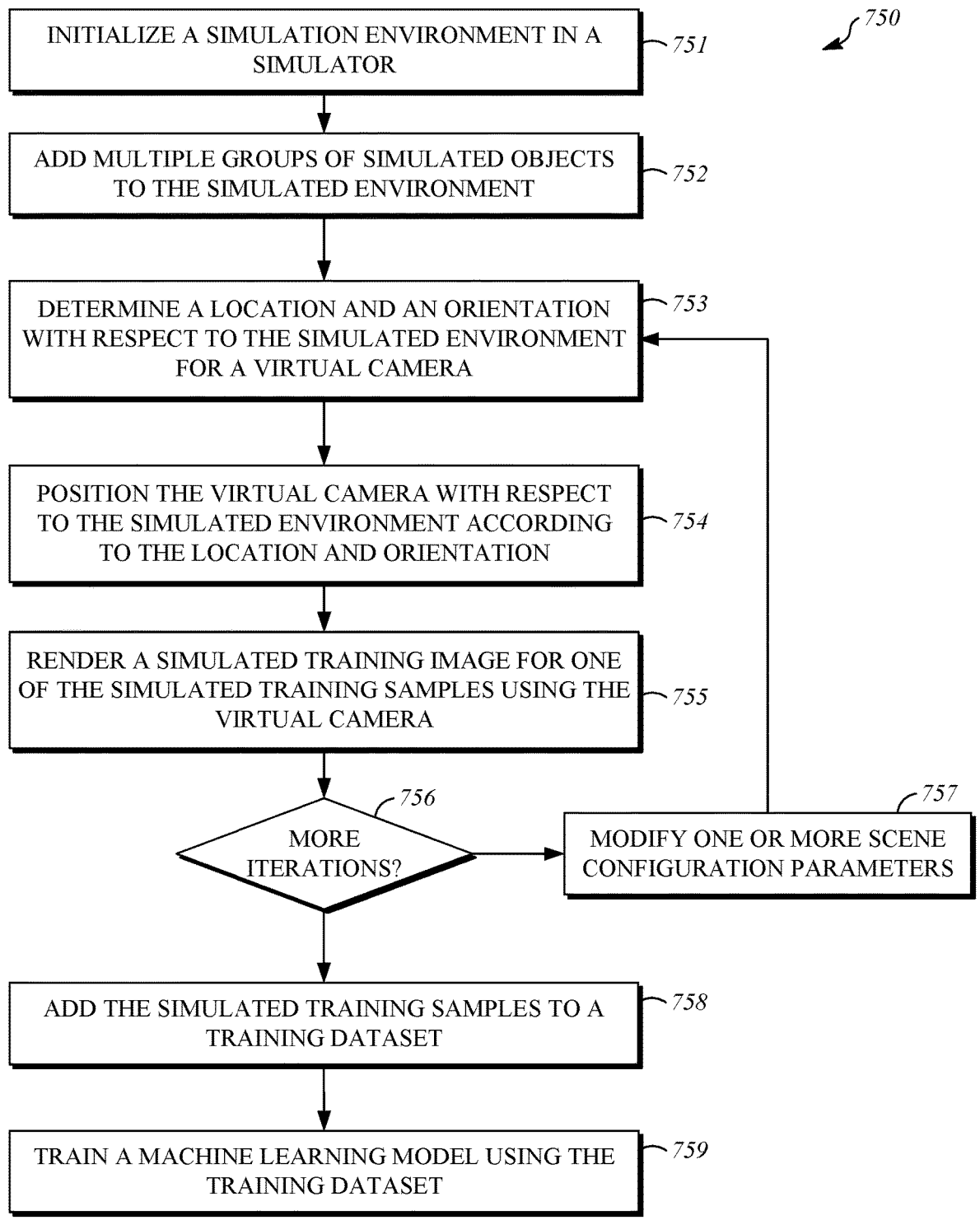
FIG. 7 is a flowchart that shows a process for generating simulated images and training using the simulated images.

FIG. 7 is a flowchart that shows a process 750 for generating simulated images for training and training using the simulated images. The process 750 can be executed using a computing device such as one or more processors that execute instructions that are stored in memory. The instructions cause performance of the process 750 by the computing device. Alternatively, the process 750 can be implemented directly in hardware, firmware, or software, circuitry, or a combination thereof. The process 750 may be implemented using a simulator, such as the simulator 210 and using a training system that is configured to optimize a machine learning model, such as the training system 440.

Operation 751 includes initializing a simulation environment in a simulator. The simulation environment may be implemented in the manner described with respect to the simulation environment 212. As an example, initializing the simulation environment can include loading a three-dimensional model that represents an environment using a simulator, such as the simulator 210. Initializing the simulation environment can also include loading additional assets and information such as scenery, lighting, virtual cameras, and computer program instructions that control the behavior of assets (e.g., scripts). Once the simulation environment is initialized, the simulation environment can be used for image rendering or other simulation operations, for example, as previously discussed with respect to the simulator 210.

Operation 752 includes adding multiple groups of simulated objects to the simulated environment. Adding multiple groups of simulated objects to the simulated environment may be performed according to scene configuration parameters, for example, as described with respect to the scene configuration 216. The simulated objects may be implemented as described with respect to the subject models 214. Aspects of placement of the simulated objects in the simulation environment can be randomized, subject to constraints applied by the scene configuration parameters, such as the number, location, appearance, and pose of the simulated objects.

The process 750 includes obtaining simulated training samples by performing multiple iterations of an image generation procedure, which will be described with reference to operations 753-757.

Operation 753 includes determining a location and an orientation with respect to the simulated environment for a virtual camera. The virtual camera may be implemented in the manner described with respect to the virtual camera 222. The location and orientation for the virtual camera are selected such that at least one group of simulated objects from the groups of simulated objects that were added to the simulated environment in operation 752 is located within a field of view of the virtual camera.

Operation 754 includes positioning the virtual camera with respect to the simulated environment according to the location and orientation that were determined in operation 753. Operation 755 includes rendering a simulated training image for one of the simulated training samples using the virtual camera.

In operation 756, a determination is made as to whether more iterations of the image generation procedure will be performed. The determination as to whether to perform more iterations of the image generation procedure can be made using any relevant information, such as the number of images generated, the amount of time elapsed, etc. As one example, additional iterations of the image generation procedure can be performed until a predetermined number of images have been generated.

If more iterations of the image generation procedure will be performed, the process proceeds to operation 757. If no further iterations of the image generation procedure will be performed, the process proceeds to operation 758.

In operation 757, the image generation procedure may also include modifying one or more scene configuration parameters that affect a visual appearance of the simulated environment. Examples include colors, textures, scenery objects, lighting conditions, and time of day. Operation 757 is optional and can be performed for each iteration of the image generation procedure, for some iterations of the image generation procedure (e.g., in response to a condition or randomly), or can be omitted. The process 750 then proceeds to operation 753.

Operation 758 includes adding the simulated training samples to a training dataset. The training dataset may also include real training samples in addition to the simulated training samples that were generated using the image generation procedure. The training dataset may also include other simulated training samples that were previously generated using the techniques described in connection with the image generation procedure of operations 753-757 or using any other suitable technique for generating simulated training images. Operation 759 includes training a machine learning model using the training dataset.

Figure 8:
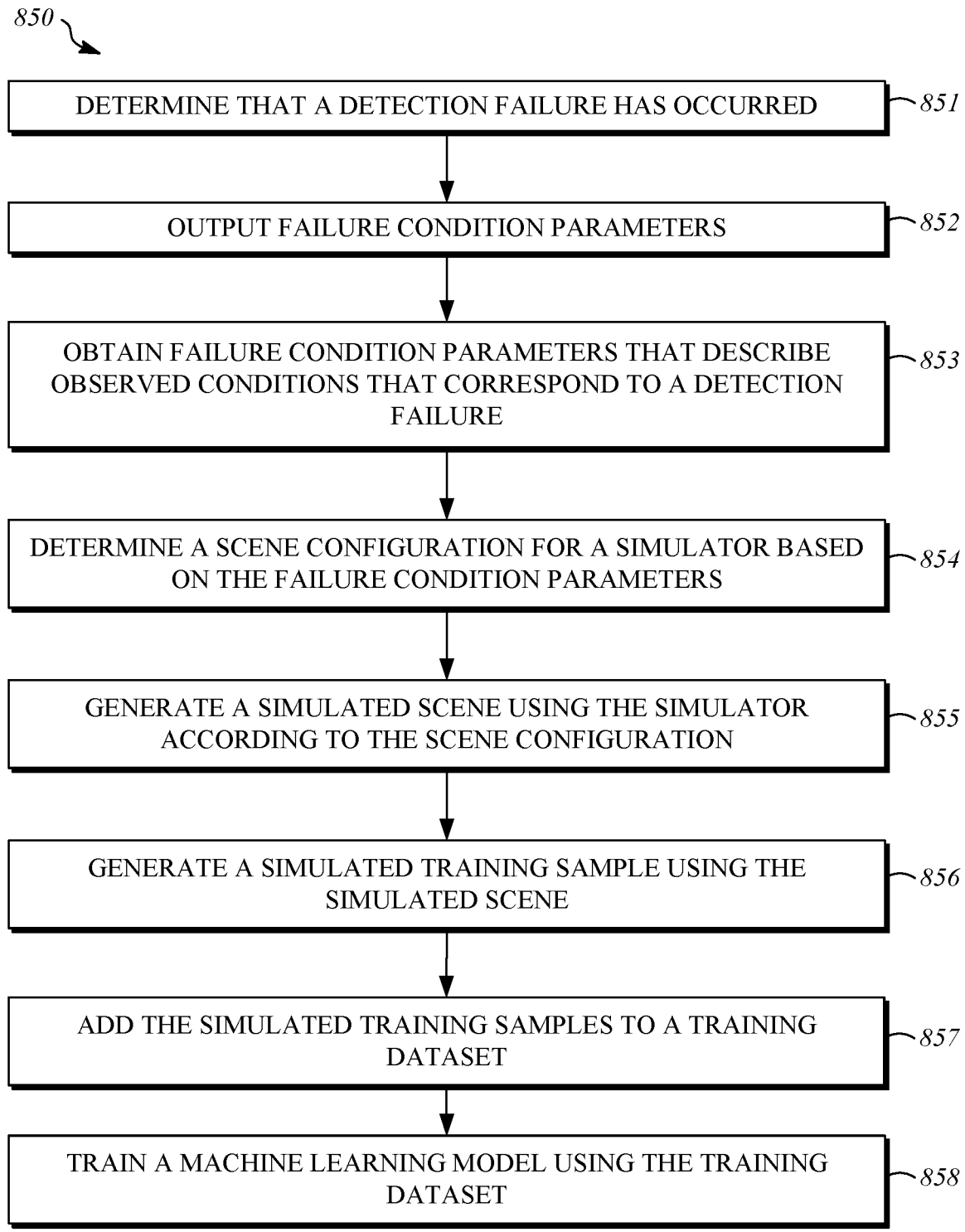
FIG. 8 is a flowchart that shows a process for generating simulated images in response to a detection failure and for training using the simulated images.

FIG. 8 is a flowchart that shows a process 850 for generating simulated images for training and training using the simulated images. The process 850 can be executed using a computing device such as one or more processors that execute instructions that are stored in memory. The instructions cause performance of the process 850 by the computing device. Alternatively, the process 850 can be implemented directly in hardware, firmware, or software, circuitry, or a combination thereof. The process 850 may be implemented using a simulator, such as the simulator 210 and using a training system that is configured to optimize a machine learning model, such as the training system 440. Portions of the process 850 (e.g., operations 851 and 852) may be performed using a real-world system that is equipped with object detection capabilities, such as the data collector 100 or by testing against data obtained using the real-world system.

Operation 851 includes determining, by the object detection system, that a detection failure has occurred. As an example, during testing of the object detection system, the object detection system may determine that the detection failure has occurred by comparison of a detected location value with a ground truth location value.

Operation 852 includes outputting the failure condition parameters that describe observed conditions that correspond to the detection failure that was detected in operation 851. The failure detection parameters can describe the circumstances under which the failure detection occurred, such as by describing types of objects present, number of objects present, locations of objects (e.g., distances from sensors), background types, sensor types, sensor settings, lighting conditions, and any other parameters. Operation 852 is performed by the object detection system. Operation 852 may be performed automatically by the object detection system in response to the determination in operation 851 that the detection failure has occurred.

Operation 853 includes obtaining, from the object detection system, the failure condition parameters that were output in operation 852.

Operation 854 includes determining a scene configuration for a simulator based on the failure condition parameters. The scene configuration 854 configures the simulator to generate simulated training samples that will be useful during further training of the machine learning model used by the object detector to improve accuracy for the conditions under which the detection failure occurred. For example, the scene configuration parameters can be configured to replicate some of the conditions under which the detection failure occurred.

Many different characteristics can be included in the scene configuration parameters in operation 854 in respect to the detection failure. As one example, a determination can be made as to types of objects present when the failure detection occurred and inclusion of similar types of objects can be dictated by the scene configuration parameters. As another example, a determination can be made as to locations of objects when the failure detection occurred, and similar placement of objects can be dictated by the scene configuration parameters. As another example, a determination can be made as to lighting conditions present when the failure detection occurred and use of similar lighting conditions can be dictated by the scene configuration parameters. As another example, a determination can be made as to sensor types and/or configurations used when the failure detection occurred and use of similar sensor types and/or configurations can be dictated by the scene configuration parameters.

Operation 855 includes generating a simulated scene using the simulator according to the scene configuration. Operation 855 can be performed, for example, as described with respect to the simulator 210, the simulation environment 212, the subject models 214, the scene configuration 216, and generation of the simulated scene 218.

Operation 856 includes generating a simulated training sample using the simulated scene. Any number of training images can be generated, and these iterations can include changing parameters such that the training images represent diverse viewpoints, backgrounds, objects, object locations, lighting conditions, and other parameters. As an example, operation 856 can be implemented as described with respect to the virtual camera 222 and the rendering engine 224.

Operation 857 includes adding the simulated training sample to a training dataset that includes real training samples. Operation 858 includes training a machine learning model using the training dataset.

Figure 9:
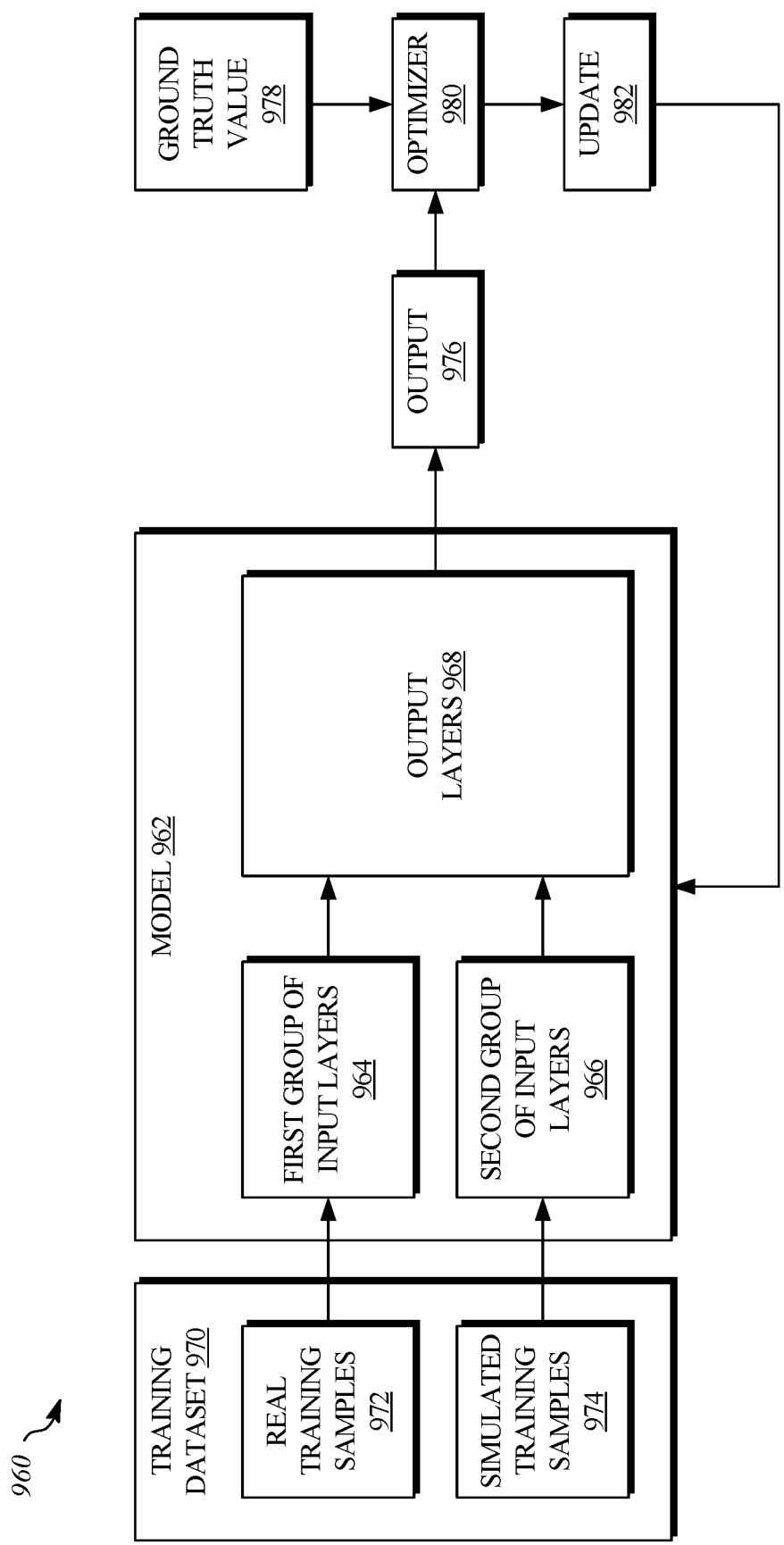
FIG. 9 is a block diagram that shows a training system for a machine learning model that includes a first group of input layers, a second group of input layers, and a group of output layers.

FIG. 9 is a block diagram that shows a training system 960 for a machine learning model 962 that includes a first group of input layers 964, a second group of input layers 966, and a group of output layers 968 Aspects of the training system 960 can be implemented using features described with respect to the data collector 100, the simulator 210, and the training system 440, and the description of these systems is incorporated herein by reference.

A training dataset 970 includes real training samples 972 and simulated training samples 974. The real training samples are similar to the training samples 104 and the simulated training samples 220.

The real training samples 972 are provided as inputs to the first group of input layers 964. The simulated training samples 974 are provided as inputs to the second group of input layers 966. Through training, the first group of input layers 964 learn to recognize features from the real training samples 972 at a high level of abstraction. Similarly, the second group of input layers 966 learn to recognize features from the simulated training samples 974 at a high level of abstraction. The outputs from the first group of input layers 964 and the second group of input layers 966 are provided to the output layers 104 as inputs. By processing the real training samples 972 and the simulated training samples 974 with separate sets of input layers, common features from each type of training sample can be processed and identified by the respective input layers, to allow the group of output layers 968 to process features of scenes that are less dependent on the real or simulated natures of the images.

The machine learning model 962 generates an output 976. During training, the output 976 is provided to an optimizer 980, which compares the output 976 to a ground truth value 978, which may be part of the training dataset 970. Based on a difference between the output 976 and the ground truth value 978, the optimizer 980 can determine an update 982 to parameters (e.g., weights) of the machine learning model 962. The optimizer 980 can be implemented according to conventional machine learning techniques. The update 982 is applied to the machine learning model 962, and training continues.

Figure 10:
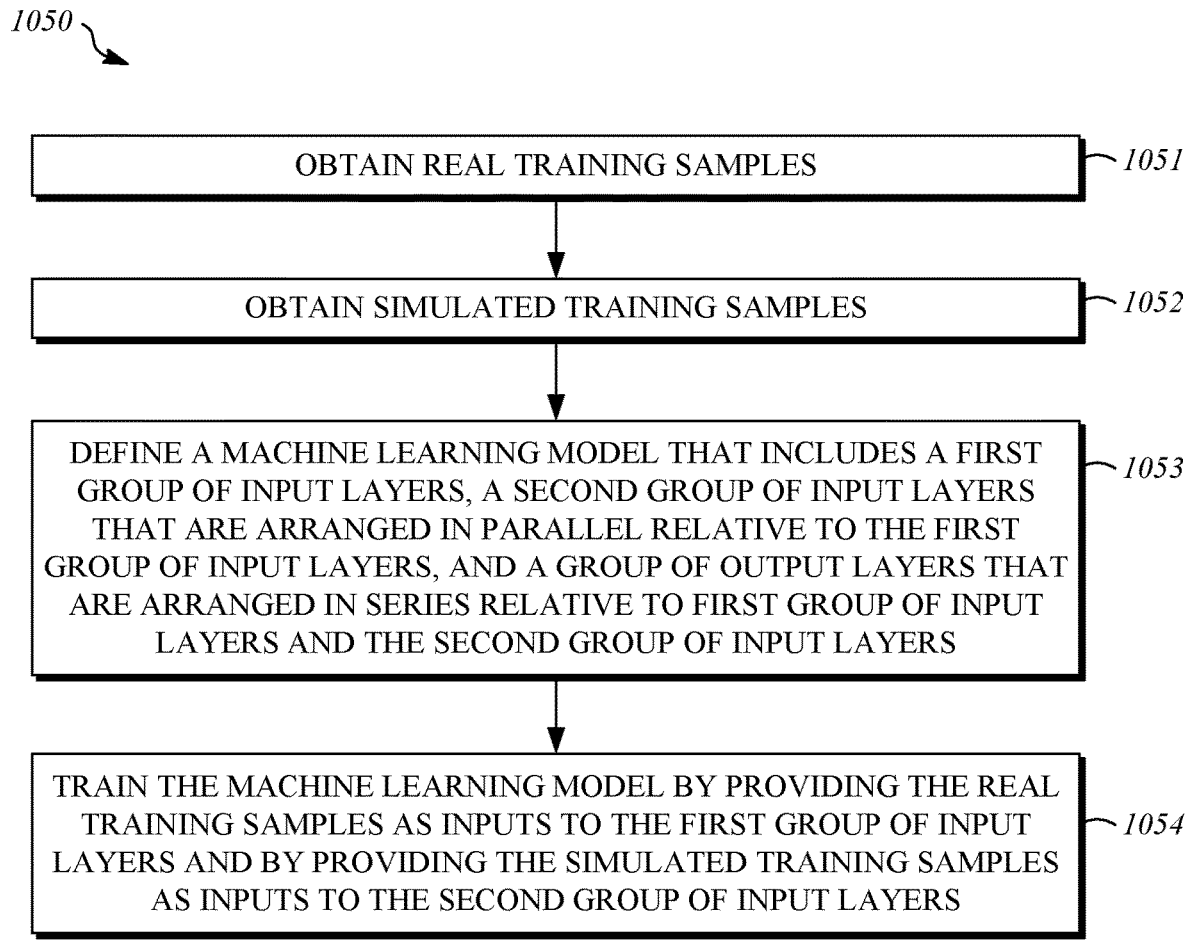
FIG. 10 is a flowchart that shows a process for training using simulated images.

FIG. 10 is a flowchart that shows a process 1050 for generating simulated images for training and training using the simulated images. The process 1050 can be executed using a computing device such as one or more processors that execute instructions that are stored in memory. The instructions cause performance of the process 1050 by the computing device. Alternatively, the process 1050 can be implemented directly in hardware, firmware, or software, circuitry, or a combination thereof.

Operation 1051 includes obtaining real training samples. The real training samples may include real images and annotations indicating locations of real objects in the real images. Obtaining the real training samples may include capturing the real images in a real-world environment using a camera. This may be done as described with respect to the data collector 100.

Operation 1052 includes obtaining simulated training samples. The simulated training samples may include simulated images and annotations indicating locations of simulated objects in the simulated images. Obtaining the simulated training samples may include rendering the simulated images using a simulator that generates a simulated scene that includes a simulation model and subject models that correspond to the simulated objects. Operation 1052 may be implemented as described with respect to the simulator 210.

Operation 1053 includes defining a machine learning model that includes a first group of input layers, a second group of input layers that are arranged in parallel relative to the first group of input layers, and a group of output layers that are arranged in series relative to the first group of input layers and the second group of input layers such that the output layers are shared by the first group of input layers and the second group of input layers. The machine learning model is configured such that the group of output layers receives outputs from the first group of input layers and the second group of input layers as inputs.

Operation 1054 includes training the machine learning model by providing the real training samples as inputs to the first group of input layers and by providing the simulated training samples as inputs to the second group of input layers. Training the machine learning model configures the machine learning model to detect subject objects in unannotated input images. Operations 1053 and 1054 may be implemented as described with respect to the training system 960.

Figure 11:
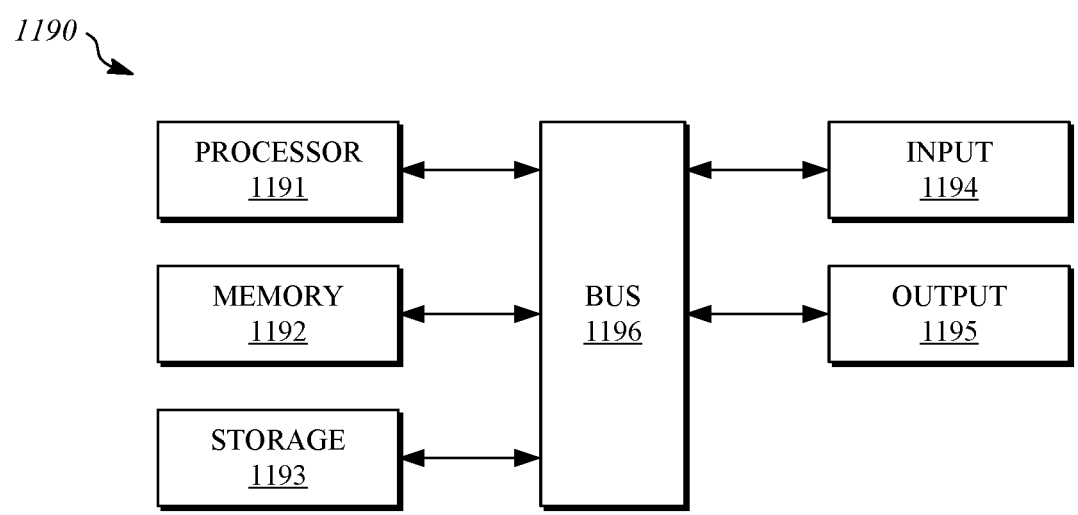
FIG. 11 is an illustration that shows an example of a hardware configuration for a computing device that can be used to implement computing devices described herein.

FIG. 11 is an illustration that shows an example of a hardware configuration for a computing device that can be used to implement computing devices described herein. The computing device 1190 may include a processor 1191, a memory 1192, a storage device 1193, one or more input devices 1194, and one or more output devices 1195. The computing device 1190 may include a bus 1196 or a similar device to interconnect the components for communication. The processor 1191 is operable to execute computer program instructions and perform operations described by the computer program instructions.

As an example, the processor 1191 may be a conventional device such as a central processing unit. The memory 1192 may be a volatile, high-speed, short-term information storage device such as a random-access memory module. The storage device 1193 may be a non-volatile information storage device such as a hard drive or a solid-state drive. The input devices 1194 may include any type of human-machine interface such as buttons, switches, a keyboard, a mouse, a touchscreen input device, a gestural input device, or an audio input device. The output devices 1195 may include any type of device operable to provide an indication to a user regarding an operating state, such as a display screen or an audio output.

The implementations described herein may be implemented in the form of methods. As an example, the processes described with respect to FIGS. 3, 5-8, and 10 may be implemented in the form of methods that include performing the operations described in the processes. As another example, the processes described with respect to FIGS. 3, 5-8, and 10 may be implemented in the form of apparatuses (e.g., including a processor and a memory that stores computer program instructions) that are configured to perform the operations that are described in the processes. As another example, the processes described with respect to FIGS. 3, 5-8, and 10 may be implemented in the form of a computer-readable storage device that includes program instructions, wherein the program instructions, when executed by a computing device, cause the computing device to perform the operations that are described in the processes.

In another example implementation, an apparatus includes a memory and a processor that is operable to execute computer program instructions that are stored in the memory. The operations, when executed by the processor, cause the processor to obtain real training samples that include real images that depict real objects, obtain simulated training samples that include simulated images that depict simulated objects, define a training dataset that includes at least some of the real training samples and at least some of the simulated training samples, and train a machine learning model to detect subject objects in unannotated input images using the training dataset.

In some implementations of the apparatus, the instructions cause the processor to obtain the real training samples by capturing the real images in a real-world environment using a camera. In some implementations of the apparatus, the instructions cause the processor to obtain the simulated training samples by generating a simulated scene that includes a simulation model and subject models that correspond to the simulated objects using a simulator and rendering the simulated images of the simulated scene using a rendering engine. The real training samples may include annotations indicating locations of the real objects in the real images. The simulated training samples may include annotations indicating locations of the simulated objects in the simulated images.

In another example implementation, an apparatus includes a memory and a processor that is operable to execute computer program instructions that are stored in the memory. The operations, when executed by the processor, cause the processor to initialize a simulation environment in a simulator, add multiple groups of simulated objects to the simulated environment, and obtain simulated training samples by performing multiple iterations of an image generation procedure. The image generation procedure includes determining a location and an orientation with respect to the simulated environment for a virtual camera such that at least one group of simulated objects from the multiple groups of simulated objects is located within a field of view of the virtual camera, positioning the virtual camera with respect to the simulated environment according to the location and orientation, and rendering a simulated training image for one of the simulated training samples using the virtual camera.

In some implementations of the apparatus, the instructions cause the processor to add the simulated training samples to a training dataset and train a machine learning model using the training dataset. The training dataset may also include real training samples.

The instructions may cause the processor to add multiple groups of simulated objects to the simulated environment may be performed according to scene configuration parameters. Each iteration of the image generation procedure may also include modifying one or more scene configuration parameters that affect a visual appearance of the simulated environment.

In another example implementation, an apparatus includes a memory and a processor that is operable to execute computer program instructions that are stored in the memory. The operations, when executed by the processor, cause the processor to obtain, from an object detection system, failure condition parameters that describe observed conditions that correspond to a detection failure, determine a scene configuration for a simulator based on the failure condition parameters, generate a simulated scene using the simulator according to the scene configuration, and generate a simulated training sample using the simulated scene.

In some implementations of the apparatus, the instructions cause the processor to add the simulated training sample to a training dataset that includes real training samples, and train a machine learning model using the training dataset.

In some implementations of the apparatus, the computer program instructions cause the processor to determine, using the object detection system, that the detection failure has occurred, and output the failure condition parameters automatically, by the object detection system, in response to the determination that the detection failure has occurred. The object detection system may determine that the detection failure has occurred by comparison of a detected location value with a ground truth location value.

In another example implementation, an apparatus includes a memory and a processor that is operable to execute computer program instructions that are stored in the memory. The operations, when executed by the processor, cause the processor to obtain real training samples, obtain simulated training samples, define a machine learning model that includes a first group of input layers, a second group of input layers that are arranged in parallel relative to the first group of input layers, and a group of output layers that are arranged in series relative to the first group of input layers and the second group of input layers, and train the machine learning model by providing the real training samples as inputs to the first group of input layers and by providing the simulated training samples as inputs to the second group of input layers.

The real training samples may include real images and annotations indicating locations of real objects in the real images, and the simulated training samples may include simulated images and annotations indicating locations of simulated objects in the simulated images. The program instructions may cause the processor to obtain the real training samples by capturing the real images in a real-world environment using a camera. The simulated training samples may be obtained by rendering the simulated images using a simulator that generates a simulated scene that includes a simulation model and subject models that correspond to the simulated objects.

In some implementations, the instructions cause the processor to train the machine learning model by. configuring the machine learning model to detect subject objects in unannotated input images. In some implementations, the group of output layers receives outputs from the first group of input layers and the second group of input layers as inputs.

In another example implementation, an apparatus includes a memory and a processor that is operable to execute computer program instructions that are stored in the memory. The operations, when executed by the processor, cause the processor to obtain real training samples that include real images that depict real objects, obtain simulated training samples that include simulated images that depict simulated objects, define a training dataset that includes at least some of the real training samples and at least some of the simulated training samples, train a machine learning model to detect subject objects in unannotated input images using the training dataset to define a trained machine learning model, detect objects using the trained machine learning model by providing sensor inputs to the trained machine learning model, and control operation of a physical system based on the detected objects.

In another example implementation, a computer-readable storage device includes computer program instructions that, when executed by a processor, cause the processor to perform operations. The operations include obtaining real training samples that include real images that depict real objects, obtaining simulated training samples that include simulated images that depict simulated objects, defining a training dataset that includes at least some of the real training samples and at least some of the simulated training samples, and training a machine learning model to detect subject objects in unannotated input images using the training dataset.

Obtaining the real training samples may include capturing the real images in a real-world environment using a camera. Obtaining simulated training samples may include generating a simulated scene that includes a simulation model and subject models that correspond to the simulated objects using a simulator and rendering the simulated images of the simulated scene using a rendering engine. The real training samples may include annotations indicating locations of the real objects in the real images. The simulated training samples may include annotations indicating locations of the simulated objects in the simulated images.

In another example implementation, a computer-readable storage device includes computer program instructions that, when executed by a processor, cause the processor to perform operations. The operations include initializing a simulation environment in a simulator, adding multiple groups of simulated objects to the simulated environment, and obtaining simulated training samples by performing multiple iterations of an image generation procedure. The image generation procedure includes determining a location and an orientation with respect to the simulated environment for a virtual camera such that at least one group of simulated objects from the multiple groups of simulated objects is located within a field of view of the virtual camera, positioning the virtual camera with respect to the simulated environment according to the location and orientation, and rendering a simulated training image for one of the simulated training samples using the virtual camera.

In some implementations, the operations include adding the simulated training samples to a training dataset and training a machine learning model using the training dataset. The training dataset may also include real training samples.

Adding multiple groups of simulated objects to the simulated environment may be performed according to scene configuration parameters. Each iteration of the image generation procedure may also include modifying one or more scene configuration parameters that affect a visual appearance of the simulated environment.

In another example implementation, a computer-readable storage device includes computer program instructions that, when executed by a processor, cause the processor to perform operations. The operations include obtaining, from an object detection system, failure condition parameters that describe observed conditions that correspond to a detection failure, determining a scene configuration for a simulator based on the failure condition parameters, generating a simulated scene using the simulator according to the scene configuration, and generating a simulated training sample using the simulated scene.

In some implementations, the operations include adding the simulated training sample to a training dataset that includes real training samples, and training a machine learning model using the training dataset.

In some implementations, the operations include determining, by the object detection system, that the detection failure has occurred, and outputting the failure condition parameters automatically, by the object detection system, in response to the determination that the detection failure has occurred. The object detection system may determine that the detection failure has occurred by comparison of a detected location value with a ground truth location value.

In another example implementation, a computer-readable storage device includes computer program instructions that, when executed by a processor, cause the processor to perform operations. The operations include obtaining real training samples, obtaining simulated training samples, defining a machine learning model that includes a first group of input layers, a second group of input layers that are arranged in parallel relative to the first group of input layers, and a group of output layers that are arranged in series relative to the first group of input layers and the second group of input layers, and training the machine learning model by providing the real training samples as inputs to the first group of input layers and by providing the simulated training samples as inputs to the second group of input layers.

The real training samples may include real images and annotations indicating locations of real objects in the real images, and the simulated training samples may include simulated images and annotations indicating locations of simulated objects in the simulated images. Obtaining the real training samples may include capturing the real images in a real-world environment using a camera. Obtaining the simulated training samples may include rendering the simulated images using a simulator that generates a simulated scene that includes a simulation model and subject models that correspond to the simulated objects.

In some implementations, training the machine learning model configures the machine learning model to detect subject objects in unannotated input images. In some implementations, the group of output layers receives outputs from the first group of input layers and the second group of input layers as inputs.

In another example implementation, a computer-readable storage device includes computer program instructions that, when executed by a processor, cause the processor to perform operations. The operations include obtaining real training samples that include real images that depict real objects, obtaining simulated training samples that include simulated images that depict simulated objects, defining a training dataset that includes at least some of the real training samples and at least some of the simulated training samples, training a machine learning model to detect subject objects in unannotated input images using the training dataset to define a trained machine learning model, detecting objects using the trained machine learning model by providing sensor inputs to the trained machine learning model, and controlling operation of a physical system based on the detected objects.

As described above, one aspect of the present technology is the gathering and use of data available from various sources to train automated systems and to use automated systems to perform actions on behalf of users. The present disclosure contemplates that in some instances, this gathered data is used to train automated systems or is used by trained automated systems at run-time may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to train the automated system in accordance with user preferences or to perform functions on behalf of users based on user preferences. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of run-time operation of automated systems, the present technology can be configured to allow users to select to "opt in" or "opt out" of participation in the collection of personal information data during registration for services or anytime thereafter. In another example, users can select not to provide personal information for use in tailoring run-time operation of an automated system. In yet another example, users can select to limit the length of time that personal data is maintained or entirely prohibit the use of personal data to tailor run-time operation of an automated system. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, automated systems can be trained or controlled at run-time by inferring preferences based on non-personal information data or a bare minimum amount of personal information, such as the request made by the device associated with a user, other non-personal information available to the automated system, or publicly available information.

What is claimed is:

1. A method comprising:
obtaining real images that depict real objects;

determining that a detection failure has occurred in which an object detection system has failed to detect one of the real objects in one of the real images;

obtaining failure condition parameters that describe observed conditions from the real image that corresponds to the detection failure;

obtaining simulated images that depict simulated objects, by generating a simulated scene using a simulator according to the failure condition parameters and rendering the simulated images of the simulated scene using a rendering engine;

defining a training dataset that includes real training samples that are based on the real images and simulated training samples that are based on the simulated images; and training a machine learning model to detect subject objects in unannotated input images using the training dataset.

2. The method of claim 1, wherein obtaining the real training samples includes capturing the real images in a real-world environment using a camera.

3. The method of claim 2, wherein generating the simulated scene using the simulator uses three-dimensional models that correspond to the simulated objects and to a simulated environment.

4. The method of claim 3, wherein the real training samples include annotations indicating locations of the real objects in the real images.

5. The method of claim 4, wherein the simulated training samples include annotations indicating locations of the simulated objects in the simulated images.

6. The method of claim 1, wherein:

generating the simulated scene using the simulator according to the failure condition parameters comprises initializing a simulation environment in the simulator, and adding multiple groups of simulated objects to a simulated environment according to the failure condition parameters, and rendering the simulated images of the simulated scene using the rendering engine comprises performing multiple iterations of an image generation procedure that includes:

determining a location and an orientation with respect to the simulated environment for a virtual camera such that at least one group of simulated objects from the multiple groups of simulated objects is located within a field of view of the virtual camera, positioning the virtual camera with respect to the simulated environment according to the location and orientation, and rendering one of the simulated training images using the virtual camera.

7. The method of claim 1, further comprising:

detecting objects using the trained machine learning model by providing sensor inputs to the trained machine learning model; and controlling operation of a physical system based on the detected objects.

8. A non-transitory computer-readable storage device including program instructions executable by one or more processors that, when executed, cause the one or more processors to perform operations, the operations comprising:

obtaining real images that depict real objects;

determining that a detection failure has occurred in which an object detection system has failed to detect one of the real objects in one of the real images;

obtaining failure condition parameters that describe observed conditions from the real image that corresponds to the detection failure;

obtaining simulated images that depict simulated objects, by generating a simulated scene using a simulator according to the failure condition parameters and rendering the simulated images of the simulated scene using a rendering engine;

defining a training dataset that includes real training samples that are based on the real images and simulated training samples that are based on the simulated images; and training a machine learning model to detect subject objects in unannotated input images using the training dataset.

9. The non-transitory computer-readable storage device of claim 8, wherein obtaining the real training samples includes capturing the real images in a real-world environment using a camera.

10. The non-transitory computer-readable storage device of claim 9, wherein generating the simulated scene using the simulator uses three-dimensional models that correspond to the simulated objects and to a simulated environment.

11. The non-transitory computer-readable storage device of claim 10, wherein the real training samples include annotations indicating locations of the real objects in the real images.

12. The non-transitory computer-readable storage device of claim 11, wherein the simulated training samples include annotations indicating locations of the simulated objects in the simulated images.

13. The non-transitory computer-readable storage device of claim 8, wherein:

generating the simulated scene using the simulator according to the failure condition parameters comprises initializing a simulation environment in the simulator, and adding multiple groups of simulated objects to a simulated environment according to the failure condition parameters, and rendering the simulated images of the simulated scene using the rendering engine comprises performing multiple iterations of an image generation procedure that includes:

determining a location and an orientation with respect to the simulated environment for a virtual camera such that at least one group of simulated objects from the multiple groups of simulated objects is located within a field of view of the virtual camera, positioning the virtual camera with respect to the simulated environment according to the location and orientation, and rendering one of the simulated training images using the virtual camera.

14. The non-transitory computer-readable storage device of claim 8, the operations further comprising:

detecting objects using the trained machine learning model by providing sensor inputs to the trained machine learning model; and controlling operation of a physical system based on the detected objects.

15. An apparatus, comprising:

a memory; and one or more processors that are configured to execute instructions that are stored in the memory, wherein the instructions, when executed, cause the one or more processors to:

obtain real images that depict real objects, determine that a detection failure has occurred in which an object detection system has failed to detect one of the real objects in one of the real images, obtain failure condition parameters that describe observed conditions from the real image that corresponds to the detection failure, obtain simulated images that depict simulated objects, by generating a simulated scene using a simulator according to the failure condition parameters and rendering the simulated images of the simulated scene using a rendering engine, define a training dataset that includes real training samples that are based on the real images and simulated training samples that are based on the simulated images, and train a machine learning model to detect subject objects in unannotated input images using the training dataset.

16. The apparatus of claim 15, wherein obtaining the real training samples includes capturing the real images in a real-world environment using a camera.

17. The apparatus of claim 16, wherein generating the simulated scene using the simulator uses three-dimensional models that correspond to the simulated objects and to a simulated environment.

18. The apparatus of claim 17, wherein the real training samples include annotations indicating locations of the real objects in the real images.

19. The apparatus of claim 18, wherein the simulated training samples include annotations indicating locations of the simulated objects in the simulated images.

20. The apparatus of claim 15, wherein the instructions further cause the one or more processors to:

generate the simulated scene using the simulator according to the failure condition parameters comprises initializing a simulation environment in the simulator, and adding multiple groups of simulated objects to a simulated environment according to the failure condition parameters, and render the simulated images of the simulated scene using the rendering engine comprises performing multiple iterations of an image generation procedure that includes:

determining a location and an orientation with respect to the simulated environment for a virtual camera such that at least one group of simulated objects from the multiple groups of simulated objects is located within a field of view of the virtual camera, positioning the virtual camera with respect to the simulated environment according to the location and orientation, and rendering one of the simulated training images using the virtual camera.

21. The apparatus of claim 15, the operations further comprising:

detecting objects using the trained machine learning model by providing sensor inputs to the trained machine learning model; and controlling operation of a physical system based on the detected objects.

* * * * *